(12) United States Patent
Kikuta

(10) Patent No.: US 12,228,749 B2
(45) Date of Patent: Feb. 18, 2025

(54) FLOATING IMAGE DISPLAY DEVICE

(71) Applicant: Mitsubishi Electric Corporation, Tokyo (JP)

(72) Inventor: Hayato Kikuta, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 536 days.

(21) Appl. No.: 17/437,844

(22) PCT Filed: Mar. 28, 2019

(86) PCT No.: PCT/JP2019/013752
§ 371 (c)(1),
(2) Date: Sep. 10, 2021

(87) PCT Pub. No.: WO2020/194699
PCT Pub. Date: Oct. 1, 2020

(65) Prior Publication Data
US 2022/0155614 A1 May 19, 2022

(51) Int. Cl.
*G02B 30/56* (2020.01)
*G02B 30/32* (2020.01)
(Continued)

(52) U.S. Cl.
CPC ............ *G02B 30/56* (2020.01); *G02B 30/32* (2020.01); *G02B 30/33* (2020.01); *G06F 3/013* (2013.01); *H04N 13/312* (2018.05)

(58) Field of Classification Search
CPC .... G02B 30/56; G02B 30/60; G02B 27/0093; H04N 13/366; H04N 13/373;
(Continued)

(56) References Cited

U.S. PATENT DOCUMENTS

2016/0363994 A1 12/2016 Yokoya
2019/0285904 A1* 9/2019 Kim .................. G02B 30/56

FOREIGN PATENT DOCUMENTS

CN 106249982 A 12/2016
JP 2012-110645 A 6/2012
(Continued)

OTHER PUBLICATIONS

Office Action issued Dec. 5, 2022 in Chinese Patent Application No. 201980094398.0, 12 pages.
(Continued)

*Primary Examiner* — Angela M. Medich
(74) *Attorney, Agent, or Firm* — XSENSUS LLP

(57) ABSTRACT

A floating image display device includes an image display, a floating image formation optical system that causes diffuse light emitted from the image display to form an image again in a space, a viewpoint position detector that acquires viewpoint position information on an observer observing the diffuse light that has passed through the floating image formation optical system, and display control circuitry. The display control circuitry estimates a floating image formation region, in which the observer perceives an image display surface in the space, based on positional relationship in the floating image formation optical system and the viewpoint position information, estimates image resolution in the floating image formation region based on the viewpoint position information and the positional relationship in the floating image formation optical system, and outputs the display image information to the image display based on information on the floating image formation region and the image resolution.

9 Claims, 6 Drawing Sheets

(51) Int. Cl.
*G02B 30/33* (2020.01)
*G06F 3/01* (2006.01)
*H04N 13/312* (2018.01)

(58) Field of Classification Search
CPC .... H04N 13/376; H04N 13/38; H04N 13/383; G06F 3/013; G09G 5/32; G09G 2340/0464
See application file for complete search history.

(56) References Cited

FOREIGN PATENT DOCUMENTS

| | | |
|---|---|---|
| JP | 2015-40944 A | 3/2015 |
| JP | 2017-107218 A | 6/2017 |
| WO | 2017/125984 A1 | 7/2017 |

OTHER PUBLICATIONS

International Search Report and Written Opinion mailed on Jun. 18, 2019, received for PCT Application PCT/JP2019/013752, Filed on Mar. 28, 2019, 8 pages including English Translation.
Office Action issued May 24, 2023 in Chinese Patent Application No. 201980094398.0 and Machine English translation thereof, 10 pages.
Office Action mailed Sep. 14, 2023, in Chinese Application No. 201980094398.0, 12 pages. (With English translation).

* cited by examiner

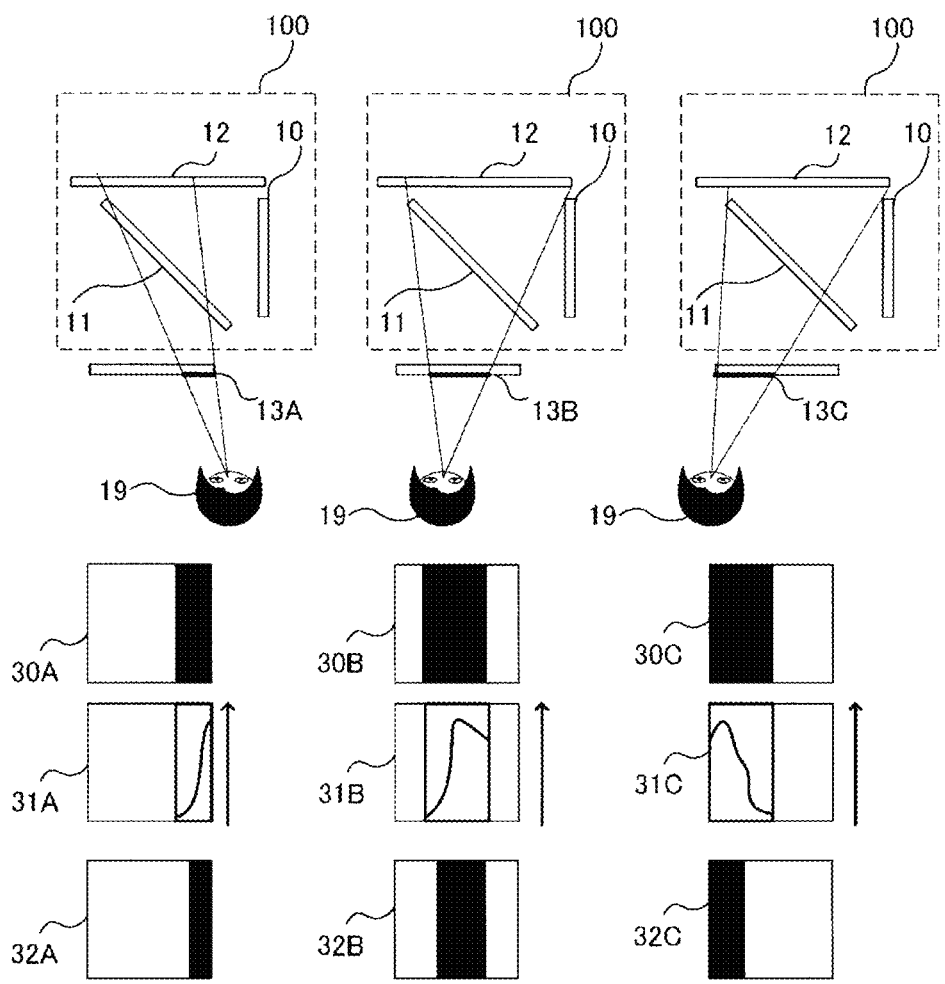

FIG. 4A
FIG. 4B
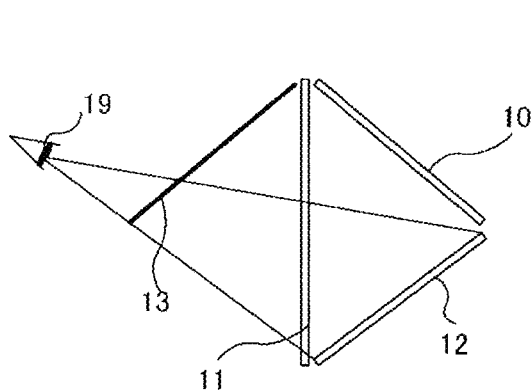
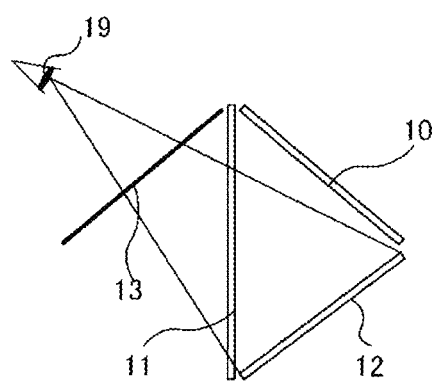
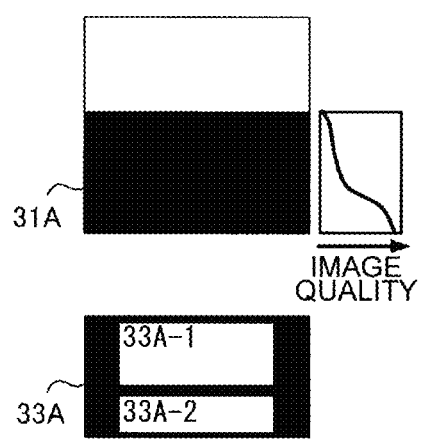
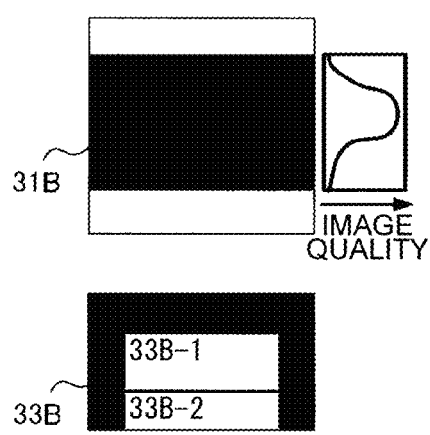

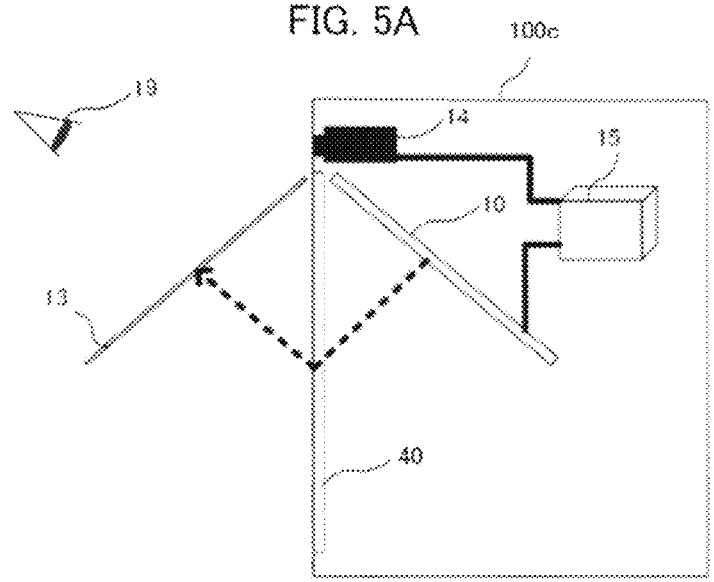

FLOATING IMAGE DISPLAY DEVICE

CROSS-REFERENCE TO RELATED APPLICATION

The present application is based on PCT filing PCT/JP2019/013752, filed Mar. 28, 2019, the entire contents of which are incorporated herein by reference.

TECHNICAL FIELD

The present invention relates to a floating image display device that displays an image in the air where there is no display element.

BACKGROUND ART

There exists a floating display device that adjusts an image, displayed by the device employing floating image formation technology for displaying an image in the air, depending on an observer of the image. A conventional floating display device enables the observer to perceive a floating image at a position appropriate for the observer by providing the device with a function of adjusting the display position of the floating image depending on the observer's viewpoint position (Patent Reference 1, for example).

PRIOR ART REFERENCE

Patent Reference

Patent Reference 1: WO 2017/125984

SUMMARY OF THE INVENTION

Problem to be Solved by the Invention

In the floating image formation technology, the change in the image quality of the floating image visualized by the observer occurs in regard to not only a display range visible to the observer but also resolution and chromaticity.

The conventional floating display device adjusts the display position according to the viewpoint position and thereby realizes a trimmed floating image only in a visible range in a wide floating image formation range. There is a problem in that the floating display device is incapable of appropriately dealing with a change in visibility accompanying the change in the image quality of the image displayed in the air only by performing the simple display position change.

The present invention, which has been made to resolve the above-described problem, provides sufficient image quality that enables the observer to recognize image information that should be visually recognized by the observer irrespective of the viewpoint position of the observer.

Means for Solving the Problem

To resolve the above-described problem, a floating image display device according to the present invention includes an image display that displays an image, a floating image formation optical system that causes diffuse light emitted from the image display to form an image again in a space by using an optical member that reflects the diffuse light, a viewpoint position information detector to acquire viewpoint position information on an observer observing the diffuse light that has passed through the floating image formation optical system, and display control circuitry receives the viewpoint position information as an input and controls display image information outputted to the image display. The display control circuitry-includes a floating image formation range estimation unit that estimates a floating image formation region, in which the observer perceives an image display surface in the space, based on positional relationship in the floating image formation optical system and the viewpoint position information. The display control circuitry estimates image resolution in the floating image formation region based on the viewpoint position information and the positional relationship in the floating image formation optical system. The display control circuitry outputs the display image information to the image display unit based on information on the floating image formation region and the image resolution.

Effect of the Invention

According to the present invention, a display device that executes the floating image formation can be used as an image display device having sufficient resolution that enables the observer to recognize image information that should be visually recognized by the observer irrespective of the viewpoint position of the observer.

BRIEF DESCRIPTION OF THE DRAWINGS

FIG. 3 is explanatory diagrams showing examples of a change in a display position in the first embodiment.

FIG. 4 are explanatory diagrams showing examples of a change in display size in the first embodiment.

FIG. 5A is an explanatory diagram showing the configuration of a floating image display device 100*c* as yet another example of the first embodiment.

MODE FOR CARRYING OUT THE INVENTION

Embodiments of the present invention will be described below according to the drawings.

First Embodiment

Figure 1:
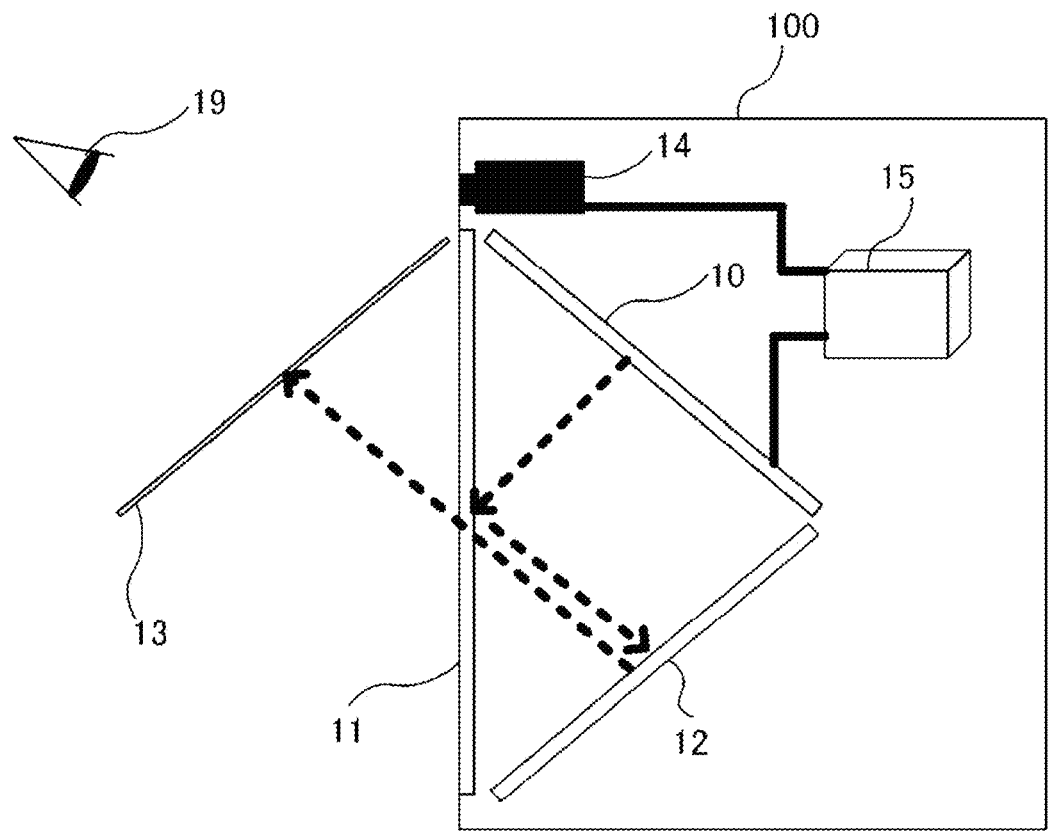
FIG. 1 is an explanatory diagram showing the configuration of a floating image display device 100 in a first embodiment.

FIG. 1 is an explanatory drawing showing the configuration of a floating image display device 100 in a first embodiment of the present invention. In FIG. 1, the floating image display device 100 includes an image display unit 10, a beam splitter 11, a retroreflective sheet 12, a viewpoint position detection device 14 and a display control unit 15. The image display unit 10 sends a displayed image to the beam splitter 11 as light. The beam splitter 11 reflects the light from the image display unit 10 and sends the reflected light to the retroreflective sheet 12. The retroreflective sheet 12 reflects the light from the beam splitter 11 and sends the reflected light to the beam splitter 11. The beam splitter 11 lets through the light from the retroreflective sheet 12. The light that passes through the retroreflective sheet 12 is perceived by an observer 19 as a floating image 13. The viewpoint position detection device 14 sends information obtained by detecting a viewpoint position of the observer 19 to the display control unit 15. The display control unit 15 sends a signal for controlling the image displayed by the image display unit 10 to the image display unit 10 based on the information from the viewpoint position detection device 14. In other words, the floating image display device 100 includes the image display unit 10 that displays an image, a floating image formation optical system that causes diffuse light emitted from the image display unit to form an image again in a different space by using an optical member having a property of multiple times of reflection and transmission, a viewpoint position information acquisition unit that acquires viewpoint position information on the observer observing the diffuse light that has passed through the floating image formation optical system, and the display control unit 15 that receives the viewpoint position information as an input and outputs display image information for controlling the image display unit, wherein the display control unit 15 includes a floating image formation range estimation unit 16 that estimates a floating image formation region, in which the observer perceives an image display surface in a space, based on the viewpoint position information and positional relationship in the floating image formation optical system, a floating image quality estimation unit 17 that estimates image resolution in the floating image formation region based on the viewpoint position information and the positional relationship in the floating image formation optical system, and a floating image display processing unit 18 that outputs the display image information to the image display unit based on the floating image formation region and the image resolution (i.e. image quality). The floating image formation optical system includes the beam splitter 11 and the retroreflective sheet 12. The viewpoint position information acquisition unit is the viewpoint position detection device 14.

The image display unit 10 is a device that outputs the displayed image as light. A display device including a liquid crystal element and a backlight like a liquid crystal display, a display device as a self-luminous device employing an organic EL element or an LED element, and a projection device employing a projector and a screen can be taken as examples of the image display unit 10. Besides such two-dimensional planar light sources mentioned above, it is also possible to employ a display using a curved surface, a display arranged three-dimensionally, a stereoscopic display having such as an LED element, or a display using a lens optical system and barrier control and implementing stereoscopic perception by means of the observer's binocular parallax and kinematic parallax.

The beam splitter 11 is an optical element that splits incident light into transmitted light and reflected light. The beam splitter 11 is a transparent plate made of resin or a glass plate, for example. In cases of a transparent plate made of resin, the intensity of the transmitted light is generally high compared to the reflected light, and thus it is also possible to use a half mirror having reflection intensity increased by adding metal, as the optical element. Further, it is possible to use a reflective polarizing plate whose reflecting behavior and transmitting behavior change depending on condition of polarization of the incident light by a liquid crystal element or a thin film element. Furthermore, it is possible to use a reflective polarizing plate in which the ratio between transmittance and reflectance changes depending on the condition of the polarization of the incident light by a liquid crystal element or a thin film element.

The retroreflective sheet 12 is a sheet-like optical element having the retroreflection function to reflect the incident light directly towards the direction of incidence. Optical elements realizing the retroreflection include optical elements of a bead type made by closely arranging small glass beads over a mirror surface, optical elements of a micro-prism type made by closely arranging minute trigonal pyramids, or trigonal pyramids hollow at their centers, in convex shapes each of whose surfaces is formed as a mirror surface, and so forth.

In this embodiment, the floating image 13 is formed by an optical system including the image display unit 10, the beam splitter 11 and the retroreflective sheet 12. The light from the image display unit 10 incident upon the beam splitter 11 is split into reflected light and transmitted light. The reflected light is incident upon the retroreflective sheet 12, undergoes the retroreflection, is incident upon the beam splitter 11 again, and is split again into reflected light and transmitted light. In the light incident upon the beam splitter 11 again, the transmitted light reaches eyes of the observer 19 situated ahead of the transmitted light. The light outputted from the image display unit 10 is diffuse light, as light diffused to the surroundings, and the diffuse light travels through the above-described optical path and thereby converges on a position plane-symmetrical with respect to the beam splitter 11. The converged light diffuses again from the point of reconvergence and reaches the eyes of the observer 19. Therefore, the observer 19 perceives that the image is projected to the position of the floating image 13.

The optical system is not limited to the above-described structure as long as the optical system is configured to make the observer 19 perceive that the image is projected to the position of the floating image 13. For example, it is possible to employ a structure (i.e., a floating image display device 100c shown in FIG. 5A) obtained by arranging a dihedral corner reflector array 40 in place of the beam splitters 11 and the retroreflective sheets 12 while stacking together two mirror surfaces orthogonal to each other in an array on a flat surface so that elements of each type form the dihedral corner reflector array. Light incident in the direction of one mirror surface of this structure is reflected by the other mirror surface and the light reaches a position symmetrical with respect to this element structure. Light from a similar diffusive light source undergoing similar reflection can reconverge similarly to FIG. 1 and thereby let the observer perceive a floating image.

The viewpoint position detection device 14 detects the viewpoint position of the observer 19. The viewpoint position detection device 14 is, for example, an image capturing device such as a camera. The viewpoint position detection device 14 detects the viewpoint position by obtaining three-dimensional position information on the observer 19 by using a compound eye camera, for example. Even in cases where the camera is a monocular camera, for example, the viewpoint position detection device 14 detects the viewpoint position by three-dimensional position estimation by use of an optical flow or by eye position estimation based on face feature points. Besides using such a camera image sensor, the viewpoint position detection device 14 may analogically estimate the eye position by detecting relative positions of the position where the observer 19 is standing and the floating image display device 100 by using a three-dimensional distance sensor employing infrared light or the like. It is also possible for the viewpoint position detection device 14 to detect the viewpoint position by analogically estimating the position where the observer 19 observes the floating image display device 100 based on physical information on the observer 19 previously obtained from the observer 19 and inputted. The physical information is, for example, body height, whether the observer 19 uses a wheelchair or not, or sitting height information. The eye position is analogically estimated based on the body height, or when the observer 19 "uses" a wheelchair and the sitting height information has been inputted, the eye position is analogically estimated by calculating the height of the viewpoint from the floor surface based on the sum total of the height of the seating face of a standard wheelchair and the sitting height.

Figure 2:
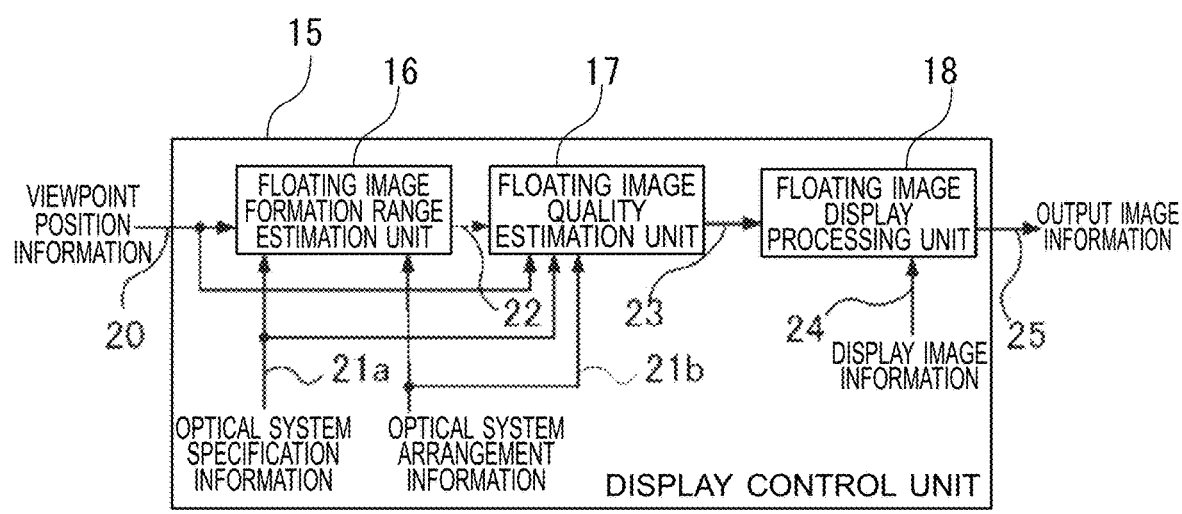
FIG. 2 is a block diagram showing the configuration of a display control unit 15 in the first embodiment.

FIG. 2 is a block diagram showing the configuration of the display control unit 15. The display control unit 15 includes the floating image formation range estimation unit 16, the floating image quality estimation unit 17 and the floating image display processing unit 18. The display control unit 15 receives viewpoint position information 20 as an input and outputs output image information 25. The floating image formation range estimation unit 16 receives the viewpoint position information 20, optical system specification information 21a and optical system arrangement information 21b as inputs and outputs floating image formation range information 22 to the floating image quality estimation unit 17. The optical system specification information 21a indicates member structure specifications of each of the beam splitter 11 and the retroreflective sheet 12, for example. The optical system arrangement information 21b is information regarding positional relationship in the floating image formation optical system. The positional relationship in the floating image formation optical system is, for example, positional relationship between the beam splitter 11 and the retroreflective sheet 12. The floating image quality estimation unit 17 receives the viewpoint position information 20, the optical system specification information 21a, the optical system arrangement information 21b and the floating image formation range information 22 as inputs and outputs floating image quality estimation information 23 to the floating image display processing unit 18. The floating image display processing unit 18 receives the floating image quality estimation information 23 and display image information 24 as inputs and outputs the output image information 25 as the display image information outputted from the display control unit 15. Details of the processing by each block will be described below.

The floating image formation range estimation unit 16 estimates a range in which the floating image perceivable to the observer 19 is formed based on the viewpoint position information 20 acquired from the viewpoint position detection device 14, the optical system specification information 21a, and the optical system arrangement information 21b. The range in which the floating image is famed is the range of the image display perceivable to the observer, included in the display surface of the image display unit 10, and it is represented by position information on a two-dimensional flat surface. The optical system specification information 21a indicates the member structure specifications of each member as mentioned earlier. Incidentally, the member structure specifications of each member are, for example, luminance, resolution and viewing angle information in regard to the image display unit 10, plate thickness, the transmittance and the reflectance in regard to the beam splitter 11, or retroreflection accuracy in regard to the retroreflective sheet 12. The optical system arrangement information 21b holds three-dimensional position information on the arrangement of components such as 3D-CAD data. For example, in a floating image formation structure employing the retroreflection, the observer 19 can perceive the floating image 13 when the beam splitter 11 is situated on the line of sight of the observer 19 viewing in the direction of the floating image 13 and the retroreflective sheet 12 is situated on a line of the transmission or the reflection from the beam splitter 11. Thus, the floating image formation range estimation unit 16 is capable of estimating the range perceivable as the floating image, included in the display surface of the image display unit 10, by performing three-dimensional optical path tracking based on the viewpoint position information 20, the optical system specification information 21a and the optical system arrangement information 21b.

The floating image formation range can be estimated also in the case of the aforementioned dihedral corner reflector array structure. In the case of the dihedral corner reflector array structure, the optical path is formed by reflection of the incident optical path once by each mirror surface. Therefore, according to the relationship among the structure, the light source and the incidence angle, it can be estimated that the image is not perceived by the observer 19 as the floating image when the reflection occurs once or less or three times of more.

The floating image quality estimation unit 17 estimates the image quality at each projection position, in the range perceivable as the floating image obtained from the floating image formation range information 22, based on the viewpoint position information 20, the optical system specification information 21a and the optical system arrangement information 21b. In the floating image formation structure employing the retroreflection, the image quality varies depending on the configured optical members and the position of the observer. Brightness, sharpness and chromaticity can be taken as an example of mainly influenced image quality elements. In this embodiment, parameters of the aforementioned image quality elements are mapped onto each pixel in the floating image display range obtained from the floating image formation range estimation result. Details of each of the image quality elements will be described below.

In regard to the brightness as an image quality element, a ratio of the luminance of the floating image 13 to a luminance value the image display unit 10 has can be defined as the degree of the change in the image quality, for example. An estimated luminance value [$cd/m^2$] of the floating image as viewed from the position of the observer is used as mapping data. The "mapping data" is data indicating the correspondence between an estimated value of the brightness at the position where the floating image is displayed and a parameter for controlling the method of expression at that position. The structure of the beam splitter 11 can be taken as an example of a factor of the change in the luminance. Since the beam splitter 11 performs reflection and transmission of the image formation optical path once each, the attenuation rate decreases depending on the product of the transmittance and the reflectance in the member structure. Further, in regard to the optical path for forming the floating image, the optical path length greatly changes depending on the distance between the beam splitter 11 and the retroreflective sheet 12, and thus when the floating image display device 100 is large sized, a difference in the optical path distance from the image display unit 10 occurs between pixels of the floating image 13 viewed by the observer and attenuation of the brightness can occur. Therefore, the display control unit 15 controls the luminance or the chromaticity of the image information outputted to the image display unit in regard to each output pixel as described below. For example, the brightness A(x) [cd/m$^2$] of the floating image 13 can be obtained according to the following expression (1) based on the luminance L(x) [cd/m$^2$] at a display pixel position x of the image display unit 10, the transmittance T of the beam splitter 11, the reflectance R of the beam splitter 11, and the attenuation rate α of light in space. Incidentally, the transmittance T of the beam splitter 11 is a value represented by using a value from 0 to 1. Similarly, the reflectance R of the beam splitter 11 is a value represented by using a decimal fraction from 0 to 1. The attenuation rate α of light in space is a value represented by using a decimal fraction from 0 to 1. Incidentally, the attenuation rate α of light in space decreases with the increase in the distance from the display pixel position x to the position where the floating image is formed, and increases with the decrease in the distance from the display pixel position x to the position where the floating image is formed. Further, there are cases where the light spreads relative to the incident light and the peak luminance drops depending on the retroreflection accuracy of the retroreflective sheet 12. In such cases, the brightness A(x) of the floating image 13 can be calculated by multiplying the luminance of each display pixel by an attenuation rate of the peak luminance due to the retroreflection accuracy that changes depending on the incidence angle.

$$A(x) = L(x) \times T \times R \times \alpha \qquad (1)$$

A drop in the sharpness as an image quality element influences the feel of resolution of the display image, and the display image is recognized by the observer as a blurred image. Since the drop in the sharpness influences frequency analysis result obtained when a test chart or an edge image is displayed, the mapping data is desired to store a maximum frequency, obtained by using certain signal intensity as a threshold value, among results of frequency analysis of contrast sensitivity such as a contrast transfer function. The structure of the beam splitter 11 can be a factor of the drop in the sharpness. In cases where the beam splitter 11 is in a plate-like shape with a thickness, an image formation optical path for forming the floating image is famed both on a front side and on a back side, and thus the sharpness drops depending on the degree of interference between floating images respectively famed on different surfaces, varying depending on the brightness of the floating image formed by each optical path and the thickness and an arrangement angle of the plate. Further, the retroreflection accuracy of the retroreflective sheet 12 drops depending on the element structure. For example, in cases of an optical element of the bead type, the light incident upon the optical element undergoes the retroreflection in the order of refraction, reflection and refraction, and thus there are cases where the reflection angle deviates from the correct retroreflection angle or the retroreflection does not occur depending on the incidence position of the light and the refraction angle from the incidence angle. For example, in cases of an optical element of the microprism type, as the result of accumulation of the reflection of the light incident upon the prism by reflecting the incident light once by each of two surfaces among the three surfaces, there occur parts where the number of times of reflection is small or large depending on the incidence position and the incidence angle of the light, and this causes deviation or attenuation in the accuracy of the retroreflection. Further, when the element structure is small, there is attenuation of light due to diffraction, and the retroreflection direction deviates. These influences of the beam splitter 11 and the retroreflective sheet 12 can be estimated based on the member structure specifications of each member and optical path information including arrangement structure information and the observer position. Incidentally, the member structure specifications are, for example, information regarding the material of the beam splitter, such as an acrylic plate, a glass plate, a half mirror or a reflective polarizing plate. Further, the member structure specifications are, for example, information regarding the element structure of the retroreflective sheet, such as an optical element of the bead type, an optical element of the microprism type, or the size of the element. Furthermore, the member structure specifications are, for example, information regarding the display element of the display device, such as a liquid crystal display, a self-luminous device employing an organic EL element or an LED element, or the like.

There are also cases where the sharpness of the floating image is hindered by an optical path, among optical paths reaching the observer, other than the optical path forming the floating image 13. For example, there are cases where the light outputted from the image display unit 10 undergoes specular reflection on the retroreflective sheet and is perceived as a mirror image situated behind the retroreflective sheet. This image interferes with the floating image 13 and works as a factor hindering the feel of resolution. In regard to this optical path, its image formation optical path can be calculated based on the arrangement structure of the members and it is possible to estimate the degree of influence on the image quality of the floating image.

In regard to the chromaticity as an image quality element, there is a possibility that a change such as chromatic aberration is caused by a change in the optical path depending on the wavelength in the image formation optical path of the floating image 13. For example, when an optical member that increases the efficiency of reflection and transmission of the beam splitter or the like by using a polarizing material as in a liquid crystal display is used as a component of the image display unit 10, color deviation according to the angle of the incident light occurs depending on a phase difference material that changes the polarization of light. In regard to such an optical member, estimating the chromaticity variation or an aberration radius and storing the estimated chromaticity variation or aberration radius as mapping data becomes possible by estimating the incidence angle by tracing the optical path from the observer position.

The floating image display processing unit 18 performs control on the display image information 24 as the object of the displaying based on the floating image quality estimation information 23 in regard to each display position of the floating image 13 and outputs the controlled display image information 24 to the image display unit. The display position, display size, display content and sharpness processing can be taken as examples of the control depending on the image quality.

FIG. 3 is explanatory diagrams showing examples of the change in the display position in the first embodiment. FIG. 3A shows a display position 13A of the floating image observed by the observer 19 when the observer 19 is situated on the right-hand side relative to the floating image display device 100, that is, when the observer 19 is standing on the left-hand side of a center of the beam splitter 11 as viewed from the floating image display device 100. FIG. 3B shows a display position 13B of the floating image observed by the observer 19 when the observer 19 is situated at the center relative to the floating image display device 100. FIG. 3C shows a display position 13C of the floating image observed by the observer 19 when the observer 19 is situated on the left-hand side relative to the floating image display device 100, that is, when the observer 19 is standing on the right-hand side of the center of the beam splitter 11 as viewed from the floating image display device 100. Examples of the control when the display position is changed will be described below. A floating image displayable range 30A, a floating image quality estimation result 31A and a floating image display position control result 32A in FIG. 3A indicate ranges of the image observed from the direction in which the observer 19 faces the floating image display device 100. A part painted with black in each of the floating image displayable range 30A, a floating image displayable range 30B and a floating image displayable range 30C is a range as the result of the estimation of the floating image display range or floating image formation region. Among the image quality elements estimated in the range by the floating image quality estimation unit 17, the result of the estimation of the sharpness is shown in the floating image quality estimation result 31A, a floating image quality estimation result 31B and a floating image quality estimation result 31C. The floating image quality estimation result 31A, the floating image quality estimation result 31B and the floating image quality estimation result 31C indicate a higher degree of adverse influence on the image quality such as blurring with the decrease in the level represented by the curved line (with a change in a direction opposite to the arrow in FIG. 3A). Incidentally, the properties of the sharpness indicated by the curved lines of the floating image quality estimation result 31A, the floating image quality estimation result 31B and the floating image quality estimation result 31C are determined by the arrangement structure of the beam splitter 11 and the retroreflective sheet 12 and the element structure of the beam splitter 11. In the display position control by the floating image display processing unit 18, a range that is higher than or equal to a certain threshold value in regard to the degree of influence on the image quality is set as a display region and the floating image is displayed only in a range painted black in each of the floating image display position control result 32A, the floating image display position control result 32B and the floating image display position control result 32C, by which a display not giving the observer a feeling of visual strangeness such as image quality difference is realized.

FIGS. 4A and 4B are explanatory diagrams showing examples of the change in the display size in the first embodiment. Examples of control of the display size and the display content will be described below. This description will be given of display control in response to a change in the viewpoint position of the observer 19 in regard to observers differing in the body height such as an adult and a child, for example. FIG. 4A shows the floating image quality estimation result 31A obtained by estimating the image quality of the floating image observed by the observer 19 and a content control result 33A when the observer 19 is at a low position with respect to the floating image display device 100. FIG. 4B shows the floating image quality estimation result 31B obtained by estimating the image quality of the floating image observed by the observer 19 and a content control result 33B when the observer 19 is at a high position with respect to the floating image display device 100. The floating image quality estimation result 31A and the floating image quality estimation result 31B indicate lower image quality as the level represented by the curved line gets closer to the left end (in a direction opposite to the arrow in FIG. 4A and FIG. 4B). When an observer 19 with a low body height such as a child observes the floating image 13 as in FIG. 4A, the floating image quality estimation result 31A indicates image quality that is high on the lower side. Based on this result, for example, content requiring high resolution such as characters is displayed in a lower part 33A-2 of the content control result 33A and the character size is set at a large size to draw attention of the child, and simple perceptual display content such as a picture effect is arranged in an upper part 33A-1 of the content control result 33A so that its display area ratio is also relatively high. In contrast, in cases of an adult or the like where the observer viewpoint position is high as in FIG. 4B, display control suitable for the observer is realized by controlling the layout structure so as to arrange small textual content, for example, in an upper part 33B-1 of the content control result 33B and arrange a lot of visual information in a lower part 33B-2 of the content control result 33B. As above, the display control unit 15 changes the contents of the display by the image display unit depending on the body height of the observer.

Next, examples of control in the sharpness processing will be described below. In the control in the sharpness processing, uniform image quality is realized by considering the lowest image quality in a floating image range shown to the observer and executing image processing so that the image quality becomes equal for all the pixels. In adjustment of brightness in the image processing, it is possible to decrease the amount of light by controlling a driving circuit of a backlight light source of a liquid crystal element or an LED light source, or to execute reconversion while reducing a luminance component at the time when luminance hue conversion was performed on the display image itself, for example. In regard to the sharpness, this control can be carried out by executing low resolution processing such as blurring by reducing high frequency components of each luminance by performing a filter process together with vicinal pixels.

Further, edge enhancement processing depending on the content can also be taken as an example of the control by means of image processing. In display content like a geometric shape or characters, the enhancement of extracted edge regions causes a strong visual effect, and thus optimum display control can be realized by appropriately switching the sharpness processing between the edge enhancement and the uniformalization depending on the display content control result.

While the display control examples described above are control examples in which only the sharpness result in the floating image quality estimation result 31 is used as a parameter, the floating image quality estimation unit is capable of performing the estimation also of the brightness and the chromaticity, and employs a control process that uses a plurality of image quality elements as weighting parameters depending on the contents of the control. For example, while the brightness and the sharpness are major elements contributing to the perceptibility to the observer, the degrees of importance of these elements change depending on the display content. In cases of textual content, the sharpness is more important in terms of readability and is highly weighted, whereas in cases of simple content such as an illustration or an icon or content with various colors that should be perceived, the weighting of the brightness is considered to increase since stronger visual stimulation by the image itself is desired. In cases of content with various colors, the influence of the chromaticity is strong, and thus the weighting of the chromaticity increases.

Figure 5:
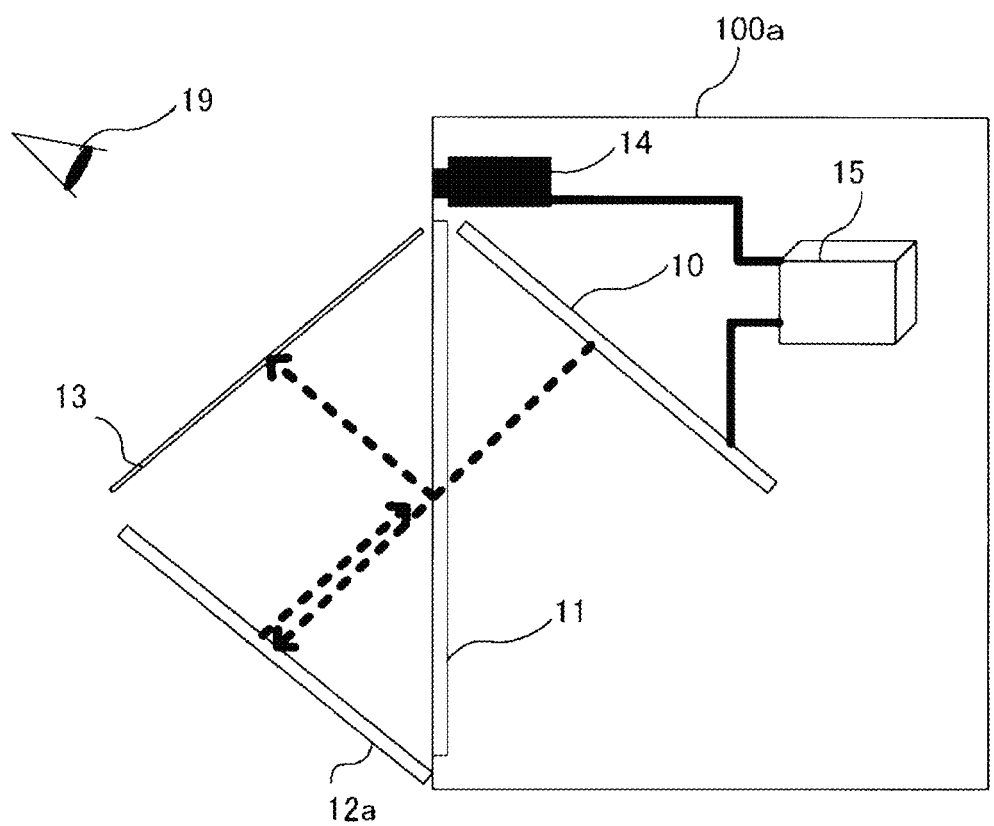
FIG. 5 is an explanatory diagram showing the configuration of a floating image display device 100*a* as another example of the first embodiment.

FIG. 5 is an explanatory diagram showing the configuration of a floating image display device 100a as another example of the first embodiment. The floating image display device 100a is configured by modifying the floating image display device 100 to arrange a retroreflective sheet 12*a* behind the beam splitter 11 as viewed from the image display unit 10. In that case, the light from the image display unit 10 incident upon the beam splitter 11 passes through the beam splitter 11 and is incident upon the retroreflective sheet 12*a*, and thereafter the light after undergoing the retroreflection is incident upon the beam splitter 11, is reflected by the beam splitter 11, and thereby reaches the observer 19. The above-described arrangement of the retroreflective sheet 12 can be employed in addition to the arrangement configuration shown in FIG. 1, in which case utilization efficiency of light in the floating image can be increased since both of a transmission split component and a reflection split component of the light first incident upon the beam splitter can be utilized for the optical path for forming the floating image.

Further, even besides the member configurations shown in FIG. 1 and FIG. 5, there are structures capable of forming a floating image. For example, the dihedral corner reflector array structure, in which two mirror surfaces orthogonal to each other are stacked together and arranged in an array on a flat surface, can be employed as such a structure. Light incident in the direction of one mirror surface of this structure is reflected by the other mirror surface, and the light reaches a position symmetrical with respect to this element structure. Light from a similar diffusive light source undergoing similar reflection can reconverge similarly to FIG. 1 or FIG. 5 and thereby let the observer perceive a floating image.

As described above, the floating image display device 100 in the first embodiment estimates the range of the formation of the floating image perceivable to the observer based on the viewpoint position information 20, the optical system specification information 21*a* and the optical system arrangement information 21*b* and then estimates the image quality at each projection position, and provides sufficient resolution that enables the observer to recognize image information that should be visually recognized by the observer irrespective of the viewpoint position of the observer.

Second Embodiment

Figure 6:
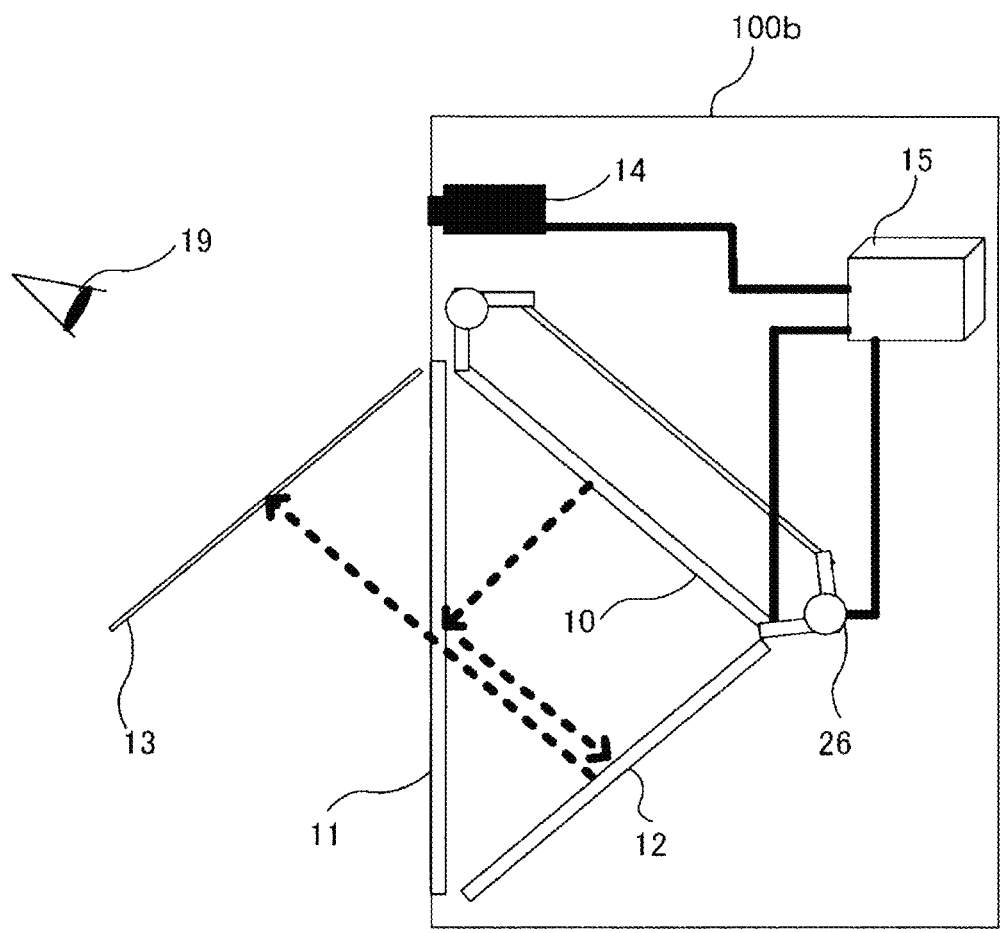
FIG. 6 is an explanatory diagram showing the configuration of a floating image display device 100 in a second embodiment.

FIG. 6 is an explanatory diagram showing the configuration of a floating image display device 100*b* in a second embodiment. The floating image display device 100*b* includes a position adjustment unit 26 in the image display unit 10 in addition to the components of the floating image display device 100 in the first embodiment. The position adjustment unit 26 is, for example, a device that changes the position of the image display unit 10 by using a mechanical mechanism such as a stepping motor. The position adjustment unit 26 can also be a unit that changes the display position as viewed from the observer by using a mechanism that controls the optical path of the image display light by controlling the light emitted from the image display unit 10 such as a lens mechanism or an electronic barrier that can be driven for the position adjustment. Incidentally, the operation of the display control unit 15 is the same as that in the first embodiment.

Figure 7A:
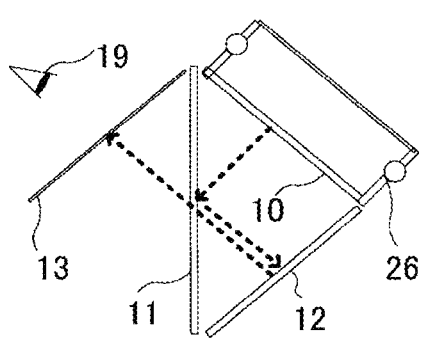
FIG. 7 are explanatory diagrams showing examples of display control in the second embodiment.
Figure 7B:
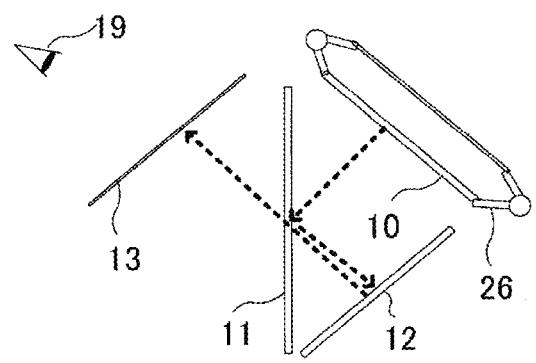

FIGS. 7A and 7B are explanatory diagrams showing examples of display control in the second embodiment. Specifically, FIGS. 7A and 7B show explanatory diagrams excerpting the image display unit 10, the beam splitter 11, the retroreflective sheet 12 and the floating image 13 in the floating image display device 100*b* shown in FIG. 6. FIG. 7A shows an example of placing the image display unit 10 and the beam splitter 11 close to each other by using the position adjustment unit 26, and FIG. 7B shows an example of placing the image display unit 10 and the beam splitter 11 far from each other by using the position adjustment unit 26. In FIGS. 7A and 7B, a floating image display that is visually optimum for the observer 19 is realized by adjusting the arrangement position of the image display unit 10 depending on the position of the observer 19. When the display control shown in FIGS. 7A and 7B is executed, the floating image formation range estimation unit 16 estimates the floating image formation range information 22 in regard to each image formation position of the floating image 13 that changes depending on an adjustment range of the position adjustment unit 26. Similarly, the floating image quality estimation unit 17 also estimates the floating image quality estimation information in regard to each piece of floating image formation range information 22. For example, when the observer 19 moves to a far position and observes the floating image 13, the position adjustment unit 26 places the image display unit 10 and the beam splitter 11 far from each other. When the observer 19 moves to a close position and observes the floating image 13, the position adjustment unit 26 places the image display unit 10 and the beam splitter 11 close to each other.

In the display control by using the position adjustment unit 26, the adjustment of the arrangement of the image display unit 10 is made so as to realize an optimum viewing distance based on the three-dimensional position information on the viewpoint position of the observer. Further, the adjustment of the arrangement of the image display unit 10 is made so as to realize a viewing distance adapted to the floating image formation range and a visual field range based on the three-dimensional position information on the viewpoint position of the observer. For example, in cases of a display with a wide pixel pitch such as an LED display, the control is executed to increase the distance between the viewpoint position of the observer 19 and the floating image 13 since it becomes difficult for the observer to perceive the shape and the feel of resolution of the image content itself if the distance between the viewpoint position of the observer 19 and the floating image 13 is short. Thus, when a display with a wide pixel pitch is employed as the image display unit 10, the position adjustment unit 26 places the image display unit 10 and the beam splitter 11 far from each other. In contrast, when a display with a narrow pixel pitch is employed as the image display unit 10, the position adjustment unit 26 places the image display unit 10 and the beam splitter 11 close to each other. Further, in displaying an icon or the like, in cases of displaying display content that requires the observer 19 to pay visual attention thereto such as an alert, the visual attention drawing effect can be produced strongly by projecting the display content to a position close to the viewpoint position.

Further, a control method according to the change in the position of the observer 19 with time can also be taken as an example of the display control. When the observer 19 has moved and the distance from the observer 19 to the floating image display device 100*b* has changed, the range of the formation of the floating image is controlled so that a change in the position of the range becomes similar to the change in the distance by using the functions of the display position control and the display device position adjustment, by which the observer 19 can view the floating image following the movement of the observer 19 and the visual recognition level can be increased.

As described above, the floating image display device 100*b* in the second embodiment estimates the range of the formation of the floating image perceivable to the observer based on the viewpoint position information 20, the optical system specification information 21a and the optical system arrangement information 21b, then estimates the image quality at each projection position, and makes the adjustment of the arrangement of the image display unit 10 so as to realize the viewing distance adapted to the floating image formation range and the visual field range based on the three-dimensional position information on the viewpoint position of the observer, by which recognizability of the floating image to the observer 19 can be increased.

While the embodiments of the present invention have been described as above, the present invention is not limited to these embodiments.

DESCRIPTION OF REFERENCE CHARACTERS

10: image display unit
11: beam splitter
12: retroreflective sheet
13: floating image
14: viewpoint position detection device
15: display control unit
16: floating image formation range estimation unit
17: floating image quality estimation unit
18: floating image display processing unit
19: observer
20: viewpoint position information
21a: optical system specification information
21b: optical system arrangement information
22: floating image formation range information
23: floating image quality estimation information
24: display image information
25: output image information
26: position adjustment unit
30: floating image display range estimation result
31: floating image quality estimation result
32: floating image display position control result
33: content control result
100: floating image display device

What is claimed is:

1. A floating image display device comprising:
an image display that displays an image;
a floating image formation optical system that causes diffuse light emitted from the image display to form a floating image again in a space;
a viewpoint position detector to acquire viewpoint position information on an observer observing the diffuse light that has passed through the floating image formation optical system; and
display control circuitry configured to receive the viewpoint position information as an input and controls display image information outputted to the image display,
to estimate a floating image formation region, which contains the floating image the observer perceives, in the space by performing three-dimensional optical path tracking based on positional relationship in the floating image formation optical system and the viewpoint position information,
to estimate image resolution of the floating image in the floating image formation region based on the viewpoint position information and the positional relationship in the floating image formation optical system, and
to output the display image information to the image display based on information on the floating image formation region and the image resolution.

2. The floating image display device according to claim 1, wherein the display control circuitry controls at least one of a display size and a display position of the image information outputted to the image display.

3. The floating image display device according to claim 1, wherein the display control circuitry executes a process of reducing high frequency components of gradation of the image information outputted to the image display.

4. The floating image display device according to claim 1, wherein the display control circuitry controls brightness or chromaticity of the image information outputted to the image display in regard to each output pixel.

5. The floating image display device according to claim 1, wherein the display control circuitry changes contents of the image by the image display depending on height of the observer's viewpoint from a floor surface.

6. The floating image display device according to claim 1, wherein the display control circuitry changes an arrangement position of the image display.

7. The floating image display device according to claim 1, wherein the floating image formation optical system comprises a beam splitter that splits incident light into transmitted light and reflected light and a retroreflective sheet that reflects incident light towards a direction of incidence.

8. The floating image display device according to claim 1, wherein the floating image formation optical system comprises a dihedral corner reflector array into which two mirror surfaces are disposed together orthogonal to each other in an array on a flat surface.

9. The floating image display device according to claim 1, wherein the viewpoint position detector includes an image sensor and calculates the viewpoint position information from information obtained by capturing an image of the observer as a subject.

* * * * *